(12) United States Patent
Rutz et al.

(10) Patent No.: US 12,312,451 B2
(45) Date of Patent: May 27, 2025

(54) BENZOXAZINE RESIN COMPOSITION, PREPREG, AND FIBER-REINFORCED COMPOSITE MATERIAL

(71) Applicant: Toray Industries, Inc., Tokyo (JP)

(72) Inventors: Benjamin Rutz, Tacoma, WA (US); Toshiya Kamae, Tacoma, WA (US)

(73) Assignee: Toray Industries, Inc., Tokyo (JP)

( * ) Notice: Subject to any disclaimer, the term of this patent is extended or adjusted under 35 U.S.C. 154(b) by 611 days.

(21) Appl. No.: 17/634,339

(22) PCT Filed: Sep. 28, 2020

(86) PCT No.: PCT/IB2020/000785
§ 371 (c)(1),
(2) Date: Feb. 10, 2022

(87) PCT Pub. No.: WO2021/064458
PCT Pub. Date: Apr. 8, 2021

(65) Prior Publication Data
US 2022/0289921 A1    Sep. 15, 2022

Related U.S. Application Data

(60) Provisional application No. 63/064,154, filed on Aug. 11, 2020, provisional application No. 62/909,385, filed on Oct. 2, 2019.

(51) Int. Cl.
C08J 5/24        (2006.01)

(52) U.S. Cl.
CPC .............. *C08J 5/24* (2013.01); *C08J 2379/08* (2013.01)

(58) Field of Classification Search
CPC .................................. C08J 5/24; C08J 2379/08
See application file for complete search history.

(56) References Cited

U.S. PATENT DOCUMENTS

| | | | |
|---|---|---|---|
| 3,856,752 | A | 12/1974 | Bateman et al. |
| 4,607,091 | A | 8/1986 | Schreiber |
| 5,021,484 | A | 6/1991 | Schreiber et al. |
| 5,200,452 | A | 4/1993 | Schreiber |
| 5,543,516 | A | 8/1996 | Ishida |
| 7,732,627 | B2 | 6/2010 | Takai et al. |
| 2004/0044141 | A1 | 3/2004 | McGrail et al. |
| 2004/0242839 | A1 | 12/2004 | Takai |
| 2011/0135944 | A1* | 6/2011 | Setiabudi ........... C08G 59/4014 528/391 |
| 2014/0357836 | A1 | 12/2014 | Kitao et al. |
| 2015/0141583 | A1 | 5/2015 | Arai et al. |
| 2015/0376406 | A1 | 12/2015 | Wang et al. |

FOREIGN PATENT DOCUMENTS

| | | |
|---|---|---|
| EP | 2397521 A1 | 12/2011 |
| JP | 2001214054 A | 8/2001 |
| JP | 2006083229 A | 3/2006 |
| JP | 2008214561 A | 9/2008 |
| JP | 2017088732 A | 5/2017 |
| WO | 03018674 A1 | 3/2003 |
| WO | 2011125665 A1 | 10/2011 |
| WO | 2014137717 A1 | 9/2014 |
| WO | 2017196805 A1 | 11/2017 |

OTHER PUBLICATIONS

International Search Report and Written Opinion for International Application No. PCT/IB2020/000785, dated Dec. 15, 2020, 7 pages.
International Preliminary Report on Patentability and Written Opinion for International Application No. PCT/IB2020/000785, issued Apr. 5, 2022, 5 pages.

\* cited by examiner

*Primary Examiner* — Catherine S Branch
*Assistant Examiner* — Andrea Wu
(74) *Attorney, Agent, or Firm* — Buchanan Ingersoll & Rooney PC

(57) ABSTRACT

A curable benzoxazine resin composition for a fiber-reinforced composite material is provided which contains at least a component [A], a component [B], and a component [C]. The component [A] includes at least one multifunctional benzoxazine resin having a non-hydrocarbon linkage such as carbonyl, oxygen, sulfur, sulfone or sulfoxide between aromatic moieties. The component [B] includes at least one multifunctional benzoxazine resin having a direct bond or a hydrocarbon linkage between aromatic moieties. The component [C] includes at least one cycloaliphatic epoxy resin containing at least two epoxy groups which are part of cycloaliphatic rings. The curable benzoxazine resin composition is useful in the molding of fiber-reinforced composite materials. More particularly, the curable benzoxazine resin composition makes possible a fiber-reinforced composite material where the cured material obtained by heating has superior performance in extreme use environments, such as high temperature and high compressive load.

15 Claims, No Drawings

BENZOXAZINE RESIN COMPOSITION, PREPREG, AND FIBER-REINFORCED COMPOSITE MATERIAL

CROSS-REFERENCE TO RELATED APPLICATIONS

This is the U.S. National Phase application of PCT/IB2020/000785, filed Sep. 28, 2020 which claims priority from U.S. Provisional Application No. 62/909,385, filed on Oct. 2, 2019; and from U.S. Provisional Application No. 63/064,154, filed on Aug. 11, 2020, both of which are incorporated by reference herein in their entireties for all purposes.

FIELD OF THE INVENTION

The present invention relates to a benzoxazine resin composition, a prepreg, and a fiber-reinforced composite material, e.g., a carbon fiber-reinforced composite material. More specifically, the present disclosure provides a benzoxazine resin composition for use in fiber-reinforced composite materials which has superior performance in extreme use environments, such as high temperature and high compressive load.

BACKGROUND OF THE INVENTION

Fiber-reinforced composite materials comprising reinforcing fiber and a matrix resin are light weight and possess outstanding mechanical properties, so they are widely used in sports, aerospace, and general industrial applications.

Methods for producing fiber-reinforced composite materials include methods in which an uncured matrix resin is infused into reinforcing fiber to form a sheet-form prepreg intermediate, followed by curing, and resin transfer molding methods in which liquid-form resin is made to flow into reinforcing fiber that has been placed in a mold to produce an intermediate, followed by curing. With those methods that employ prepregs, the fiber-reinforced composite material is normally obtained by autoclave processing subsequent to layering multiple sheets of prepreg. The matrix resin that is used in the prepreg is commonly a thermosetting resin, in view of productivity considerations.

Phenol resins, melamine resins, bismaleimide resins, unsaturated polyester resins, epoxy resins, and the like have been used as the thermosetting resin. However, from the standpoint of improving modulus and heat resistance, investigations have been progressing in recent years concerning the use of benzoxazine resins as matrix resins in fiber-reinforced composite materials as disclosed in International Pat. Pub. No. WO 2003018674.

However, most multifunctional benzoxazine resins have melting points around or above room temperature and high viscosities. These properties give benzoxazine resins the disadvantage of poor tackiness and draping properties when used as a matrix material for prepreg in combination with reinforcing fiber. Multifunctional glycidyl epoxy resins that are liquids at 40° C. or less have been effectively used as reactive diluents for benzoxazines, as disclosed in U.S. Pat. Pub. No. 20150141583. These epoxies are effective reactive diluents for benzoxazines because they are effective at reducing the viscosity of benzoxazine resin, thermoplastic compounds can easily be dissolved in them, and they increase the crosslink density of the cured matrix, thereby improving the glass transition temperature over that of neat benzoxazine resin. Including a cycloaliphatic epoxy resin in a resin composition can reduce the viscosity, decrease the water absorption, reduce the UV degradation, and increase the glass transition temperature relative to a benzoxazine resin composition containing glycidyl type epoxy resins, as disclosed in U.S. Pat. Pub. No. 20150376406.

Not to be bound by any particular theory, it is generally accepted that brittle materials, i.e., materials having low toughness and elongation, suffer from reduced tensile strength when used in fiber-reinforced composite materials. Thus, it is preferred that a thermoplastic compound be added to the benzoxazine resin composition in order to improve tensile strength and fracture toughness in composite applications. As adding a thermoplastic compound also increases the viscosity of the benzoxazine resin when the thermoplastic compound is fully dissolved (the ideal case for improving the aforementioned properties), it is essential that a reactive diluent be added to the formulation to reduce the viscosity of the benzoxazine resin. In general, the viscosity of the benzoxazine resin composition should be between 1 and 50,000 poise when the temperature is between 25° C. and 100° C. If the benzoxazine resin composition is intended for use in the hot melt method of prepregging, the viscosity should be between 10 and 10,000 poise when the temperature is between 60° C. and 100° C. In general, the modulus of a matrix material for fiber-reinforced composites for structural applications should be as high as possible. For aerospace applications, the flexural modulus of the matrix material, as measured according to ASTM D790, should be at least 3.0 GPa at 25° C., conditioned at 25° C. and 50% relative humidity.

Generally, there is a trade-off between glass transition temperature and modulus. Increasing the ratio of cycloaliphatic epoxy to benzoxazine will increase the cured glass transition temperature of the resin, but will decrease the modulus. Alternatively, different benzoxazines can be utilized to generate a high glass transition temperature, but there will be a corresponding reduction in modulus. Hence, there is a need for a new composition having both a high glass transition temperature and also a high modulus of the cured resin.

SUMMARY OF THE INVENTION

To solve the aforementioned problem, the present inventors have discovered that utilizing a blend of multifunctional benzoxazines where at least one benzoxazine contains a non-hydrocarbon linkage (i.e., a linkage containing at least one heteroatom, in particular a linkage containing at least one oxygen and/or at least one sulfur atom, which may be in the form, for example, of an ether linkage, a sulfide linkage, a ketone linkage, a sulfone linkage or a sulfoxide linkage) and at least one benzoxazine contains a direct bond as a linkage or a hydrocarbon linkage (i.e., a linkage containing carbon and hydrogen atoms, but no heteroatoms), and at least one cycloaliphatic epoxy achieves both a high glass transition temperature and modulus in the cured matrix and low viscosity in the uncured state at room temperature. The present invention therefore provides a benzoxazine resin composition that can be cured to form a cured product excellent in heat resistance, thereby overcoming the disadvantages of the resin compositions known in the prior art as described above.

This invention according to exemplary embodiments relates to a benzoxazine resin composition for a fiber-reinforced composite material, comprising a component [A], a component [B], and a component [C] wherein:

a) the component [A] is comprised of at least one benzoxazine of Formula (IA):

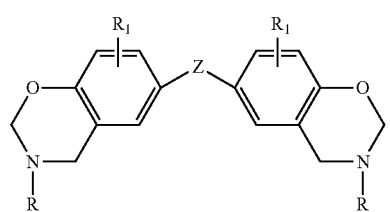

Formula (IA)

wherein Z is selected from C=O, CH$_2$OC(=O), O, S, S=O, or O=S=O, each R is independently selected from hydrogen, a C$_1$-C$_{20}$ alkyl group, an allyl group, or a C$_6$-C$_{14}$ aryl group, and each R$_1$ is independently selected from hydrogen, a C$_1$-C$_{20}$ alkyl group, an allyl group, or a C$_6$-C$_{14}$ aryl group;

b) the component [B] is comprised of at least one benzoxazine of Formula (IA') and/or Formula (IB'):

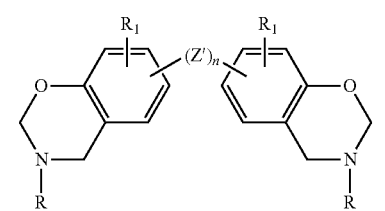

Formula (IA')

wherein n is 0 or 1; if n=1, Z' is selected from a substituted or unsubstituted C$_1$-C$_{20}$ alkyl group, a substituted or unsubstituted divalent C$_6$-C$_{20}$ aryl group, or a substituted or unsubstituted divalent C$_2$-C$_{20}$ heteroaryl group; and if n=0, the benzyl groups of the benzoxazine moieties may be fused or connected by a direct bond between the two benzoxazine moieties;

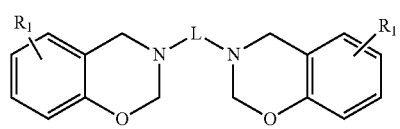

Formula (IB')

wherein L is selected from a divalent hydrocarbon linkage group such as CH$_2$, C(CH$_3$)$_2$, CH(CH$_3$), dicyclopentadiene, Ar, and Ar—Y—Ar, where Y may be a direct bond C(R$_2$)(R$_3$), C(R$_2$)(Ar), a divalent heterocycle, [C(R$_2$)(R$_3$)]$_x$Ar—[C(R$_4$)(R$_5$)]$_y$, S, SO$_2$, and O, where Ar is an aryl group. R$_2$, R$_3$, R$_4$, and R$_5$ are independently selected from H, C$_1$-C$_8$ alkyl and halogenated alkyl;

c) the component [C] is comprised of at least one cycloaliphatic epoxy resin represented by Formula (II):

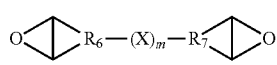

Formula (II)

wherein m=0 or 1; R$_6$ and R$_7$ are the same or different and are each a substituted or an unsubstituted C$_1$-C$_{20}$ aliphatic moiety which together with carbon atoms of an epoxy group form at least one aliphatic ring, wherein m is 0 or 1; when m=1, X represents a single bond, two single bonds or, a divalent moiety; wherein when m=0, the aliphatic rings are fused which include R$_6$ and R$_7$ (that is, a fused ring system is present which involves R$_6$ and R$_7$);

d) The curable benzoxazine resin composition, wherein component [A] and component [B] are present in a mass ratio [A]/[B] of between 1/2 and 5/1 inclusive and component [A], component [B] and component [C] are present in a mass ratio [C]/([A]+[B]) of between 1/9 and 2/3 inclusive.

In an embodiment, the component [C] includes at least one cycloaliphatic epoxy resin represented by Formula (II), wherein R$_6$ and R$_7$ are each independently part of a cyclopentane ring, a cyclohexane ring, or a norbornane ring.

In an aspect, the curable benzoxazine resin composition further comprises a component [D], wherein component [D] comprises a thermoplastic compound comprising one or more repeating units. In an embodiment, the thermoplastic compound is a polyethersulfone or polyimide. In another embodiment, the thermoplastic compound is a polyimide having a backbone which additionally contains phenyltrimethylindane or phenylindane units.

In an aspect of the curable benzoxazine resin composition, the component [A] is comprised of two or more multifunctional benzoxazines, which differ in at least one of Z, R or R$_1$. In another aspect, the component [B] is comprised of two or more multifunctional benzoxazines, which differ in at least one of Z', L, R, or R$_1$.

In an embodiment, wherein the cured benzoxazine resin composition has a glass transition temperature of at least 215° C., as determined by the G' onset method and a flexural modulus of elasticity of at least 4.3 GPa at 25° C.

In an aspect, the component [A] is comprised of at least one benzoxazine of Formula (IA) wherein Z is S.

In an aspect, the component [A] is comprised of at least one benzoxazine represented by Formula (IV), Formula (V), Formula (VI), Formula (VII) or Formula (VIII), as disclosed hereinbelow. In another aspect, the component [B] is comprised of at least one benzoxazine represented by Formula (IX), Formula (X), Formula (XI), Formula (XII), Formula (XIII), or Formula (XIV), as disclosed hereinbelow.

In another aspect of the invention, the component [A] is comprised of at least one benzoxazine represented by Formula (V):

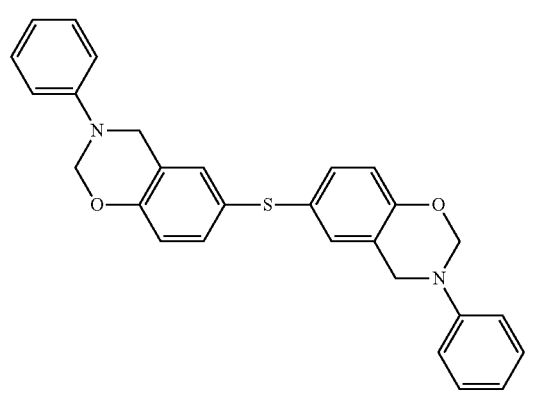

Formula (V)

and the component [B] is comprised of at least one benzoxazine represented by Formula (IX) or Formula (XI):

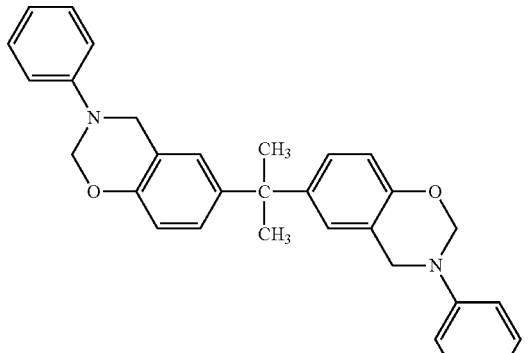

Formula (IX)

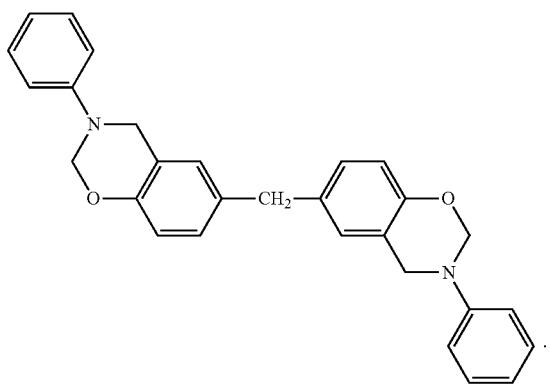

Formula (XI)

In an aspect of the present invention, provided herein are prepregs comprising a reinforcing fiber matrix impregnated with a curable benzoxazine resin composition in accordance with any of the above-mentioned embodiments. In another aspect of the present invention, a fiber-reinforced composite material is obtained by curing such a prepreg. In yet another aspect, a laminate body is formed from a plurality of such prepregs. Further embodiments of the invention provide a fiber-reinforced composite material comprising a cured resin product obtained by curing a mixture comprised of a benzoxazine resin composition in accordance with any of the above-mentioned embodiments and fibers, wherein the fibers may be made from carbon, glass, ceramic, polymer, or natural materials, for example.

DETAILED DESCRIPTION OF EMBODIMENTS OF THE INVENTION

All publications, patents, and patent applications cited in this specification are hereby incorporated by reference in their entirety for all purposes.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this specification are used to describe and account for small fluctuations. For example, they can refer to amounts or quantities that differ from a stated value by less than or equal to ±5%.

Reference throughout this specification to "one embodiment" or "an embodiment" means that a particular feature, structure, or characteristic described in, connection with the embodiment is included in at least one embodiment. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless otherwise specified, "room temperature" as used herein refers to a temperature of 25° C.

As used herein, viscosity refers to the complex viscoelastic modulus n* as measured at a frequency 10 rad/s and a gap length of 0.6 mm using a dynamic viscoelastic measuring device (ARES, manufactured by TA Instruments) and circular parallel plates 40 mm in diameter as the temperature is monotonically increased at a rate of 2° C./min.

As used herein, the term PHR means "parts per hundred resin", and accounts for only the reactive portion of the resin formulation (i.e., the components of the resin formulation which undergo a chemical reaction when the resin formulation is cured, e.g., benzoxazines and epoxy resins).

As used herein, the term, "fiber-reinforced composite material" is used interchangeably with the terms "fiber-reinforced composite," "fiber-reinforced polymer material," "fiber-reinforced polymer," "fiber-reinforced plastic material," "fiber-reinforced plastic," and "carbon fiber reinforced polymer."

In accordance with the present disclosure, a benzoxazine resin composition can be obtained that has superior heat resistance (when cured) and superior processability as well as mechanical properties in regards to modulus when cured. Moreover, by using the benzoxazine resin composition of the present disclosure, a fiber-reinforced composite material with an excellent modulus and glass transition temperature can be obtained by curing this benzoxazine resin composition and such fiber-reinforced composite material manifests superior mechanical properties when used in combination with reinforcing fiber.

The benzoxazine resin composition, the prepreg, and the fiber-reinforced composite material of the present disclosure are described in detail below.

As a result of extensive research in view of the difficulties described above, the inventors have discovered that the aforementioned problems are resolved by employing, in fiber-reinforced composite material applications, a benzoxazine resin composition formed by mixing at least a component [A] comprised of at least one multifunctional benzoxazine with a non hydrocarbon linkage, at least a component [B] comprised of at least one multifunctional benzoxazine with a hydrocarbon linkage, and at least a component [C] comprised of at least one cycloaliphatic epoxy resin having certain structural features and mixed in a particular ratio.

As used herein, the term "multifunctional benzoxazine" means a benzoxazine compound having at least two oxazine rings attached to benzene rings within the molecule, that is to say one which is at least difunctional. Difunctional and trifunctional benzoxazine resins and combinations thereof are particularly useful in embodiments of the present invention.

According to certain embodiments, each of the component [A] and the component [B] comprises, consists essentially of or consists of at least one multifunctional benzoxazine containing two or more structural units as represented by general Formula (III) below.

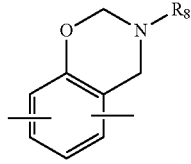

Formula (III)

In Formula (III), $R_8$ may denotes a linear alkyl group with a carbon number of 1 to 12, a cyclic alkyl group with a carbon number of 3 to 8, a hydrogen, a phenyl group, or a phenyl group that is substituted with a linear alkyl group having a carbon number of 1 to 12 or a halogen.

In the structural unit represented by the general Formula (III) above, non-limiting examples of $R_8$ include a methyl group, ethyl group, n-propyl group, isopropyl group, n-butyl group, isobutyl group, t-butyl group, cyclopentyl group, cyclohexyl group, phenyl group, o-methylphenyl group, m-methylphenyl group, p-methylphenyl group, o-ethylphenyl group, m-ethylphenyl group, p-ethylphenyl group, o-t-butylphenyl group, m-t-butylphenyl group, p-t-butylphenyl group, o-chlorophenyl group, o-bromophenyl group, dicyclopentadiene group or benzofuranone group. Among these groups, it is preferable to use a methyl group, ethyl group, propyl group, phenyl group, or o-methylphenyl group, as the presence of such groups contributes to favorable handling properties.

The structural units represented by structural Formula (III) for component [A] are linked through a non-hydrocarbon divalent linkage group such as C=O, CH$_2$OC(=O), S, SO$_2$, SO, or O. Suitable non-hydrocarbon divalent linkage groups may be characterized as containing at least one heteroatom selected from oxygen and sulfur. Such divalent non-hydrocarbon linkage groups may bond to a carbon atom in the benzene ring of one structural unit of Formula (III) and to a carbon atom in the benzene ring of another structural unit of Formula (III).

The structural units represented by structural Formula (III) for component [B] may be linked directly (e.g., by a single bond connecting benzene rings), or through a hydrocarbon linkage group, especially a divalent hydrocarbon linkage group such as CH$_2$, C(CH$_3$)$_2$, CH(CH$_3$), or dicyclopentadiene, or the benzyl groups of the benzoxazine moieties may be fused. Such divalent hydrocarbon linkage groups may bond to a carbon atom in the benzene ring of one structural unit of Formula (III) and to a carbon atom in the benzene ring of another structural unit of Formula (III). It is also possible for the structural units of structural Formula (III) to be linked through the nitrogen atoms of such structural units (involving the $R_8$ substituents) by means of a divalent linkage group, corresponding to the general formula N-L-N where L is a divalent linkage group and each N is part of an oxazine ring. For example, such a linker group may be Ar—CH$_2$—Ar, wherein Ar is an aryl group. Other suitable linkage groups include Ar, Ar—S—Ar, and Ar—O—Ar.

In an embodiment of the multifunctional benzoxazine, difunctional benzoxazines, comprising two structural units as represented by general Formula (III), suitable for use as component [A] in the present invention include, for example, those represented by the following Formula (IA):

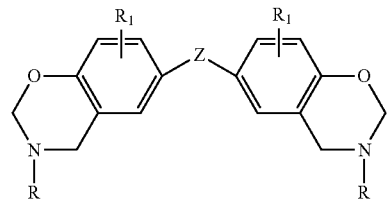

Formula (IA)

For component [A], Z in Formula (IA) is selected from C=O, CH$_2$OC(=O), O, S, S=O, or O=S=O.

R and R$_1$ in Formula (IA) are independently selected from alkyl (e.g., C$_1$-C$_8$ alkyl), cycloalkyl (e.g., C$_5$-C$_7$ cycloalkyl, preferably C$_6$ cycloalkyl) and aryl, wherein the cycloalkyl and aryl groups are optionally substituted, for instance by C$_1$-C$_8$ alkyl, halogen and amine groups, and, where substituted, one or more substituent groups (preferably one substituent group) may be present on each cycloalkyl and aryl group.

In an embodiment of the multifunctional benzoxazine, difunctional benzoxazines, comprising two structural units as represented by general Formula (III), suitable for use as component [B] in the present invention include, for example, those represented by the following Formula (IA') and Formula (IB'):

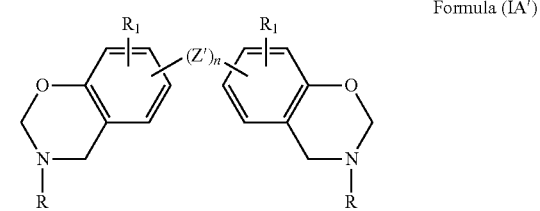

Formula (IA')

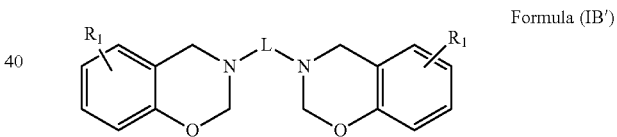

Formula (IB')

In Formula (IA'), n is 0 or 1. When n=1, Z' may be selected from a direct bond, C(R$_2$)(R$_3$), C(R$_2$)(Ar), a divalent heterocycle (e.g., 3,3-isobenzofuran-1(3h)-one) and [C(R$_2$)(R$_3$)]$_x$—Ar—[C(R$_4$)(R$_5$)]$_y$. When n=0, the benzyl groups of the benzoxazine moieties may be fused or connected by a direct bond between the two benzoxazine moieties.

In Formula (IB'), L may be selected from divalent hydrocarbon linkage group such as CH$_2$, C(CH$_3$)$_2$, CH(CH$_3$), dicyclopentadiene, Ar and Ar—Y—Ar, where Y may be a direct bond, C(R$_2$)(R$_3$), C(R$_2$)(Ar), a divalent heterocycle (e.g., 3,3-isobenzofuran-1(3h)-one), [C(R$_2$)(R$_3$)]$_x$-aryl-[C(R$_4$)(R$_5$)]$_y$, S, SO$_2$, and O, where Ar is an aryl group and x and y are independently 0 or 1.

R in Formula (IA') are independently selected from hydrogen, a C$_1$-C$_{20}$ alkyl group, an allyl group, or a C$_6$-C$_{14}$ aryl group, and each R$_1$ is independently selected from hydrogen, a C$_1$-C$_{20}$ alkyl group, an allyl group, or a C$_6$-C$_{14}$ aryl group. R$_1$ in Formula (IB') may be independently selected from the same groups.

R$_2$, R$_3$, R$_4$, and R$_5$ are independently selected from H, C$_1$-C$_8$ alkyl (preferably C$_1$-C$_4$ alkyl, and preferably methyl), and halogenated alkyl (wherein the halogen is typically chlorine or fluorine); and x and y are independently 0 or 1. Where an aryl group is present, the aryl group is preferably phenyl. In one embodiment, the groups attached to the phenyl group may be configured in para- or meta-positions relative to each other. The group Z' and the group L may be linear or non-linear, and is typically linear. The group L is preferably bound to the nitrogen of each of the benzoxazine moieties as shown in Formula (IB'). The group Z may be attached at either of the meta-positions or the ortho-position, in one or both of the aryl group(s) in the difunctional benzoxazine compound. Thus, the group Z' may be attached to the aryl rings in a para/para; para/meta; para/ortho, meta/meta or ortho/meta configuration.

In another embodiment, the difunctional benzoxazine moieties corresponding to Formula (IA) or Formula (IA') is selected from compounds wherein each R is independently selected from aryl, or preferably phenyl. In one embodiment, the aryl group may be substituted, preferably where the substituent(s) are selected from $C_1$-$C_8$ alkyl, and preferably where there is a single substituent present on at least one aryl group. $C_1$-$C_8$ alkyl includes linear and branched alkyl chains. Preferably, each R in Formula (IA) or Formula (IA') is independently selected from unsubstituted aryl, preferably unsubstituted phenyl.

The aryl ring in each benzoxazine group of the difunctional benzoxazine moieties defined herein as Formula (IA) or Formula (IA') may be independently substituted at any of the three available positions of each ring, and typically any optional substituent is present at the position ortho to the position of attachment of the Z group or Z' group. Preferably, however, the aryl ring remains unsubstituted.

Suitable trifunctional benzoxazine resins include compounds that may be prepared by reacting aromatic triamines with phenols (monohydric or polyhydric) in the presence of aldehyde such as formaldehyde or a source or equivalent thereof.

In the present disclosure, it is preferable to use at least one monomer represented by the structural Formulas (IV) to (VIII) below as the multifunctional benzoxazine resin of component [A], and it is preferable to use at least one monomer represented by the structural Formulas (IX) to (XV) below as the multifunctional benzoxazine resin of component [B].

Formula (IV)

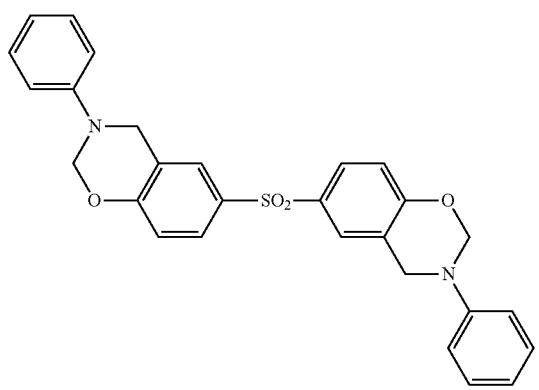

Formula (V)

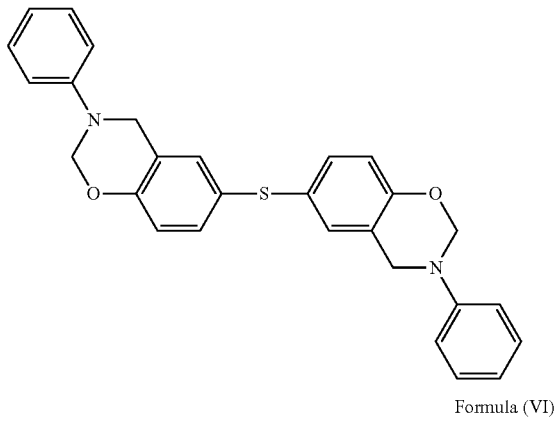

Formula (VI)

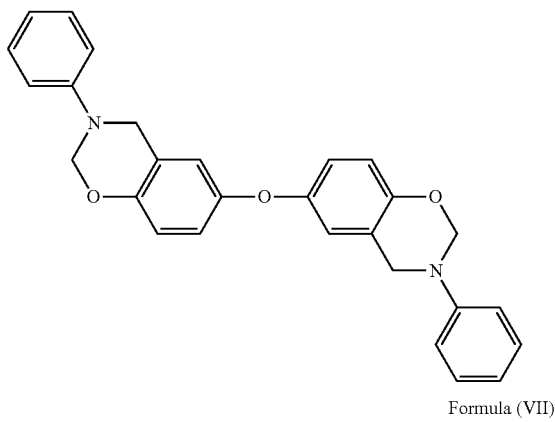

Formula (VII)

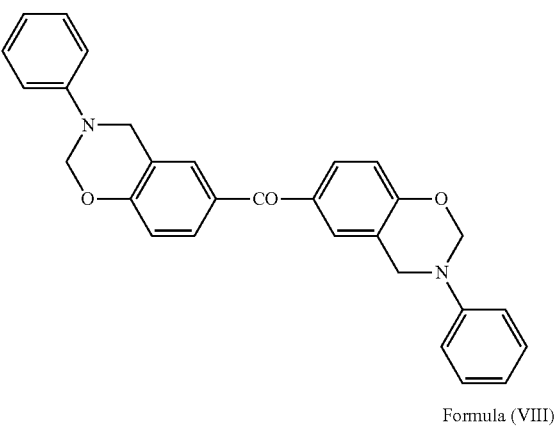

Formula (VIII)

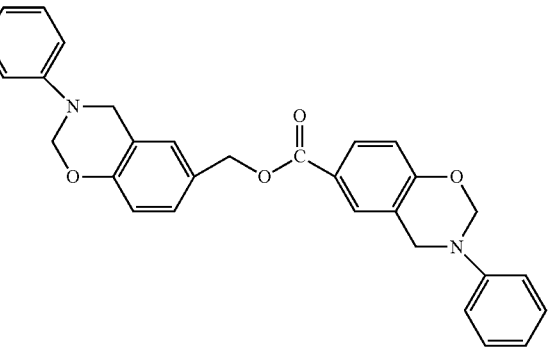

Formula (IX)

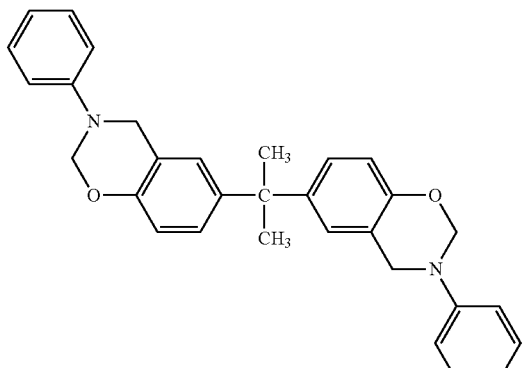

Formula (X)

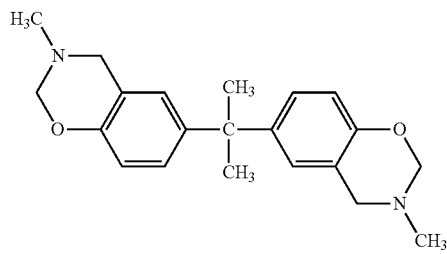

Formula (XI)

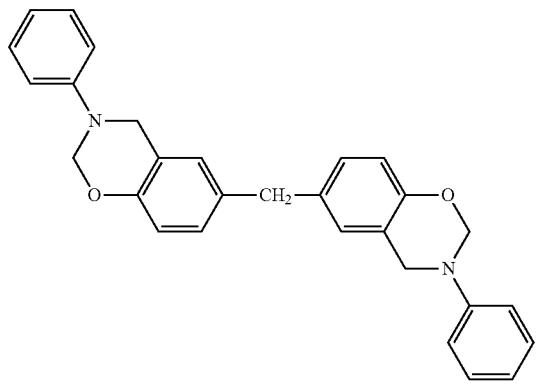

Formula (XII)

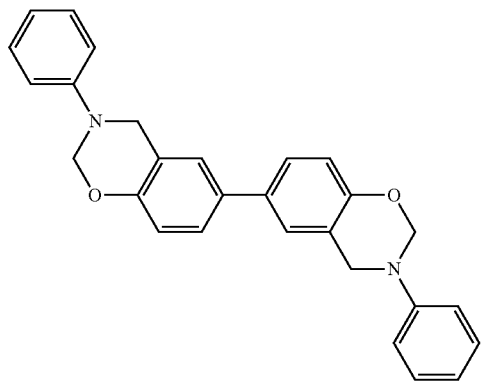

Formula (XIII)

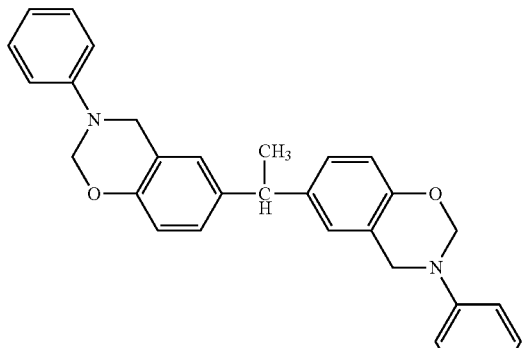

Formula (XIV)

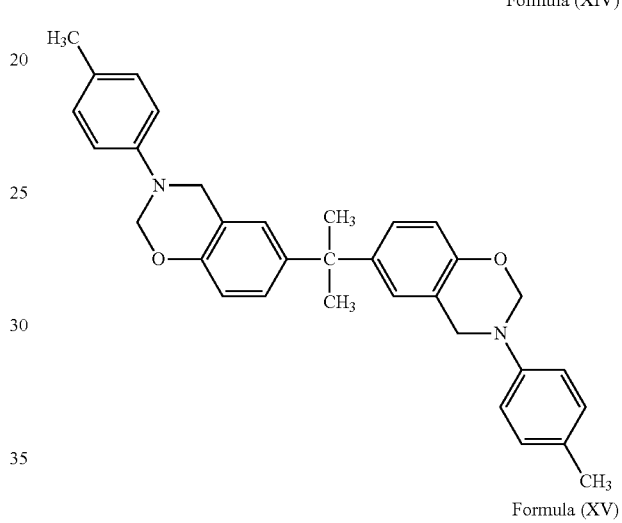

Formula (XV)

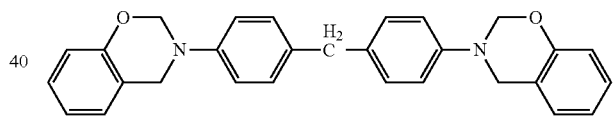

In certain embodiments of the present invention, each of the components [A] and [B] preferably comprises (or consists essentially of or consists of) at least one multifunctional benzoxazine and may be composed of monomer alone or may have the form of an oligomer in which multiple molecules are polymerized. In addition, multifunctional benzoxazines having different structures may be used together. In an embodiment, the component [A] may contain two or more multifunctional benzoxazines having non-hydrocarbon linkages, wherein the two or more multifunctional benzoxazines differ in at least one of Z, R or $R_1$, wherein the different components [A] may be designated as [An], where n is an integer from 2 to 10, such as from [A1], [A2] ... to [An]. In another embodiment, the component [B] may contain two or more multifunctional benzoxazines, wherein the two or more multifunctional benzoxazine moieties differ in at least one of Z', L, R or $R_1$, wherein the different components [B] may be designated as [Bn], where n is an integer from 2 to 10, such as from [B1], [B2] ... to [Bn].

In another embodiment of the invention, the mass ratio of the component [A] to the component [B] ([A]/[B]) is between 1/2 and 5/1 inclusive. In one embodiment, the lower limit of the mass ratio of the component [A] to the component [B] ([A]/[B]) is not less than 1/2, preferably not less than 2/3 and more preferably not less than 3/2. Moreover, the upper limit of the mass ratio of the component [A] to the component [B] ([A]/[B]) is not more than 5/1, preferably not more than 4/1, preferably not more than 3/1 and more preferably not more than 5/2. Within this range, when blended with an appropriate amount of the component [C], the benzoxazine resin composition will have simultaneously a Tg and a modulus higher than predicted by the rule of mixtures. In an embodiment, the mass ratio of the component [C] to the total amount of component [A] and the component [B] ([C]/([A]+[B])) is between 1/9 and 2/3 inclusive (the mass amount of component [C] relative to the total mass amount of the component [A] and the component [B] is not less than 1 part of the component [C] per 9 parts in total of the component [A] and the component [B] and not more than 2 parts of the component [C] per 3 parts in total of the component [A] and the component [B]).

In various embodiments of the invention, the curable benzoxazine resin composition comprises the component [A] present in an amount of less than 98 PHR and more than 1 PHR, or preferably not more than 60 PHR and not less than 27 PHR, or more preferably not more than 60 PHR and not less than 25 PHR, or especially preferably not more than 50 PHR and not less than 40 PHR. In another embodiment, the component [B] is present in an amount of less than 98 PHR and more than 1 PHR, or preferably not more than 50 PHR and not less than 15 PHR, or more preferably not more than 35 PHR and not less than 25 PHR. In some embodiments, the component [C] is present in an amount of less than 98 PHR and more than 1 PHR, or preferably not more than 40 PHR and not less than 10 PHR, or preferably not more than 30 PHR and not less than 20 PHR. Accordingly, in such embodiments the curable benzoxazine resin composition is comprised of >1 to <98 PHR of the component [A], >1 to <98 PHR of the component [B], and >1 to <98 PHR of the component [C]. In other embodiments, the curable benzoxazine resin composition comprises 25 to 60 PHR of the component [A], 15 to 50 PHR of the component [B], and 10 to 40 PHR of the component [C]. In some other embodiments, the curable benzoxazine resin composition comprises 40 to 50 PHR of the component [A], 25 to 35 PHR of the component [B], and 20 to 30 PHR of the component [C].

A fiber-reinforced composite material, such as carbon fiber reinforced polymer (CFRP) produced with the curable benzoxazine resin composition according to embodiments of the present invention, is particularly well suited for structural aerospace applications with high service temperature requirements.

The multifunctional benzoxazine resin(s) used as the component [A] may be procured from a number of suppliers, including but not limited to, Konishi Chemical Inc., Co., Ltd., and Huntsman Advanced Materials. The multifunctional benzoxazine resin(s) used as the component [B] may be procured from a number of suppliers, including but not limited to, Shikoku Chemicals Corp., Konishi Chemical Inc., Co., Ltd., and Huntsman Advanced Materials. Among these suppliers, Shikoku Chemicals Corp. offers a bisphenol A aniline type benzoxazine resin, a bisphenol A methylamine type benzoxazine resin, and a bisphenol F aniline type benzoxazine resin. Rather than using commercially-available raw material, the multifunctional benzoxazine resin can be prepared, as necessary, by allowing a reaction to occur between a phenolic compound (e.g., bisphenol A, bisphenol F, bisphenol S, or thiodiphenol), an aldehyde and an arylamine. Detailed preparation methods may be found in U.S. Pat. Nos. 5,543,516, 4,607,091 (Schreiber), U.S. Pat. No. 5,021,484 (Schreiber), and U.S. Pat. No. 5,200,452 (Schreiber).

In the present invention, an epoxy resin means an epoxy compound having at least two 1,2-epoxy groups within the molecule, that is to say an epoxy compound which is at least difunctional with respect to epoxy functional groups.

In particular, the curable benzoxazine resin compositions according to embodiments of the present invention include, as the component [C], one or more cycloaliphatic epoxy resins containing at least two epoxide groups per molecule, with at least one of the epoxide groups and preferably at least two of the epoxide groups being part of a cycloaliphatic ring. In certain embodiments of the present invention, the component [C] contains at least one cycloaliphatic epoxy resin represented by Formula (II), wherein $R_6$ and $R_7$ are the same or different and are each a substituted or an unsubstituted $C_1$-$C_{20}$ aliphatic moiety which together with carbon atoms of an epoxy group form at least one aliphatic ring (in certain cases, a bicyclic aliphatic ring is formed) and X represents a single bond or a divalent moiety. In other embodiments, X is not present in Formula (II) and the cycloaliphatic epoxy resin comprises a fused ring system involving $R_6$ and $R_7$, such as in dicyclopentadiene diepoxide.

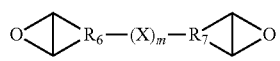

Formula (II)

wherein m is 0 or 1; $R_6$ and $R_7$ are the same or different and are each a substituted or an unsubstituted $C_1$-$C_{20}$ aliphatic moiety which together with carbon atoms of an epoxy group form at least one aliphatic ring, wherein when m=1, X represents a single bond, two single bonds, or a divalent moiety. $R_6$ and $R_7$ can each, for example, independently comprise three carbon chains or four carbon chains, thereby forming five-membered or six-membered aliphatic rings respectively. $R_6$ and/or $R_7$ can also have structures which provide bicyclic rings, such as a norbornane ring. In other embodiments, when m=0, X is not present in the cycloaliphatic epoxy resin of Formula (II) and the aliphatic rings are fused, and include $R_6$ and $R_7$ (that is, a fused ring system is present including $R_6$ and $R_7$).

Here, a cycloaliphatic epoxy resin means an epoxy resin in which there is at least two 1,2-epoxycycloalkane structural moieties (wherein each such moiety is an aliphatic ring in which two adjacent carbon atoms which are part of the aliphatic ring also are part of an epoxy ring, each being bonded to the same oxygen atom). Cycloaliphatic epoxy resins are useful because they can increase the cured Tg and reduce the viscosity of the uncured resin composition. X may be selected from $CH_2OC(=O)$, O, S, alkyl (e.g., X=$CH_2$, $CH_2CH_2$, $CH_2CH_2CH_2$, $CH_2CH(CH_3)$ or $C(CH_3)_2$), an ether-containing moiety (e.g., X=$CH_2OCH_2$), a carbonyl-containing moiety (e.g., X=$C(=O)$), an oxirane ring-containing moiety (e.g., X=CH—O—CH, wherein a single bond exists between the two carbon atoms thereby forming a three-membered ring including the oxygen atom and the two carbon atoms), or fused ring systems.

In certain embodiments, when m=0, X in Formula (II) is not present, meaning that $R_6$ and $R_7$ are part of a fused ring system. Dicyclopentadiene diepoxide is an example of a cycloaliphatic epoxy resin in which $R_6$ and $R_7$ are part of a fused ring system. In other embodiments, when m=1, X in Formula (II) is a single bond which connects cyclic groups containing $R_6$ and $R_7$.

The cycloalkane groups present in such cycloaliphatic epoxy resins may, for example, be monocyclic or bicyclic (e.g., a norbornane group). Examples of suitable monocyclic cycloalkane groups include, but are not limited to, a cyclopentane group (where $R_6$ and $R_7$ maybe $C_3H_5$ group), a cyclohexane group (where each of $R_6$ and $R_7$ is $C_4H_8$ group), or a norbornane group (where $R_6$ and $R_7$ maybe $C_5H_9$ group).

Such cycloalkane groups may be substituted (for example, with alkyl groups) or, preferably, unsubstituted. Where X is a single bond or a divalent moiety, the epoxy groups on such cyclohexane and cyclopentane rings may be present at the 2,3 or 3,4 positions on the rings.

Specific illustrative examples of cycloaliphatic epoxy resins useful as the component [C] include, but are not limited to, bis(3,4-epoxycyclohexyl) also referred to as 3,4,3',4'-diepoxybicyclohexyl); bis[(3,4-epoxycyclohexyl) ether], bis[(3,4-epoxycyclohexyl)oxirane, bis[(3,4-epoxycyclohexyl)methane], 2,2-bis(3,4-epoxycyclohexyl)propane, 3,4-epoxycyclohexylmethyl-3,4-epoxycyclohexanecarboxylate and the like and combinations thereof. In addition, mono and bi cyclopentane substituted versions of the aforementioned monomers including but not limited to, bis(3,4-epoxycyclopentyl), bis(3,4-epoxycyclopentyl) ether and 3,4-epoxycyclopentyl-3,4-epoxycyclohexyl, may be employed.

Examples of cycloaliphatic epoxy resins, where m=0, X is nonexistent (i.e., is not present), and $R_6$ and $R_7$ are part of a fused ring system, include but are not limited to, dicyclopentadiene diepoxide, tricyclopentadiene diepoxide, tetrahydroindene diepoxide, tetracyclotetradecadiene diepoxy, and pentacyclopentadecadiene diepoxy.

Illustrative examples of suitable cycloaliphatic epoxy resins include but are limited to the following compounds represented by the structural Formulas (XVI) to (XX) below as the epoxy resin of component [C].

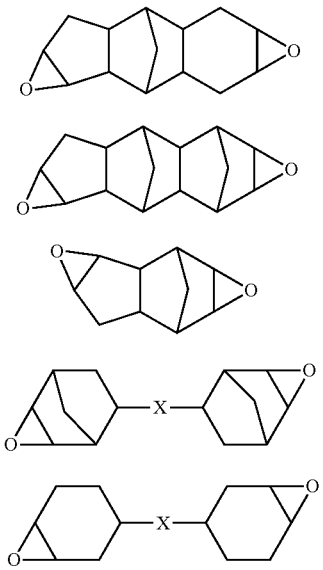

Formula (XVI)

Formula (XVII)

Formula (XVIII)

Formula (XIX)

Formula (XX)

In Formula (XIX) and Formula (XX), X=a single bond, O, S, $CH_2$, $CH_2CH_2$, $CH_2CH_2CH_2$, $CH_2CH(CH_3)$, $C(CH_3)_2$, $CH_2OCH_2$, $C(=O)$, $CH_2OC(=O)$, or oxirane; one or both of the cyclohexane rings in Formula (XX) may be replaced by a cyclopentane ring.

Formula (XIX) shown above is an example of a cycloaliphatic epoxy resin in which $R_6$ and $R_7$ are aliphatic moieties which are part of bicyclic aliphatic rings.

Formulas (XVI), (XVII) and (XVIII) are examples of cycloaliphatic epoxy resins, where m=0 in Formula (II) and in which X is not present and the cycloaliphatic epoxy resin contains fused aliphatic rings (these compounds also contain bicyclic aliphatic rings).

Such cycloaliphatic epoxy resins are known in the art and may be prepared using any suitable synthetic method, including, for example, by epoxidizing cycloaliphatic di- and tri-olefinic compounds such as compounds having a 3,3'-dicyclohexenyl skeleton. U.S. Pat. No. 7,732,627 and U.S. Pat. Pub. Nos. 2004/0242839 and 2014/0357836, for instance, describe methods for obtaining cycloaliphatic epoxy resins useful in the present invention.

Also suitable for use in the component [C] of the present invention are any of the cycloaliphatic epoxy resins disclosed in U.S. Pat. No. 4,607,091 (incorporated herein by reference in its entirety for all purposes), in particular the cycloaliphatic epoxy resins listed in Table 1.

In an embodiment of the present invention, the component [C] may contain two or more cycloaliphatic epoxy resins, which differ in at least one of X, $R_6$ and $R_7$, wherein the different cycloaliphatic epoxy resins may be designated as [C1], [C2], [C3], etc.

In one embodiment, the lower limit of the mass ratio of epoxy component [C] to the total amount of benzoxazine provided by the component [A] and the component [B] ([C]/([A]+[B])) is not less than 1/9, preferably not less than 1/5, and more preferably not less than 3/10. Moreover, the upper limit of the mass ratio of component [C] to the total amount of benzoxazine provided by the component [A] and the component [B] ([C]/([A]+[B])) is not more than 2/3, preferably not more than 1/2 and more preferably not more than 2/5. Within this range, the curable benzoxazine resin compositions having viscosity ranges that are more suitable for manufacturing processes are obtained, while also producing suitable pressure-sensitive adhesion (tackiness) and deformability (draping properties) in prepregs. In addition, because excellent modulus and glass transition temperature are maintained in the cured benzoxazine resin composition, the material will provide superior mechanical characteristics at elevated temperatures when used as a composite material. If the blend amount of the component [C] relative to the component [A] and the component [B] is less than 1/9, then the viscosity of the benzoxazine resin composition will increase, which may compromise manufacture processability, and the Tg of the material will go down, limiting the use in high temperature applications. If the blend amount of the component [C] is more than 2/3, however, the Tg will again go down. As a result, the mechanical properties when used as a composite material in hot environments will tend to be compromised.

In certain embodiments of the present invention, mixing or dissolving at least one thermoplastic compound, as a component [D], into the above-mentioned benzoxazine resin composition may also be desirable to enhance the properties of the cured material and to increase the minimum viscosity during curing to improve processing characteristics. In general, a thermoplastic compound (polymer) having bonds selected from the group consisting of carbon-carbon bonds, amide bonds, imide bonds, ester bonds, ether bonds, carbonate bonds, urethane bonds, thioether bonds, sulfone bonds and/or carbonyl bonds in the main chain of the thermoplastic compound (polymer) is preferred. Further, the thermoplastic compound can also have a partially crosslinked structure and may be crystalline or amorphous. In particular, it is suitable or preferred that at least one thermoplastic compound selected from the group consisting of polyamides, polycarbonates, polyacetals, polyphenylene oxides, polyphenylene sulfides, polyallylates, polyesters, polyamideimides, polyimides (including polyimides having a phenyltrimethylindane or phenylindane structure), polyetherimides, polysulfones, polyethersulfones, polyetherketones, polyetheretherketones, polyaramids, polyethernitriles and polybenzimidazoles is mixed or dissolved into the benzoxazine resin composition. In the case of a polyimide thermoplastic compound, the thermoplastic compound's backbone may additionally contain phenyltrimethylindane or phenylindane units.

In certain embodiments of the present invention, the glass transition temperature (Tg) of the component [D] is 150° C. or greater so that favorable heat resistance is obtained, with 170° C. or greater being preferred, with 200° C. or greater being more preferred, with 220° C. or greater being particularly preferred. If the glass transition temperature of the component [D] that is blended is less than 150° C., the resulting moldings will tend to suffer thermal deformation during use. From the standpoint of producing high heat resistance or high solvent resistance, or from the standpoint of affinity with respect to the benzoxazine resin composition, including solubility and adhesion, it is preferable to use a polysulfone, polyethersulfone, polyphenylene sulfide, polyimide (including polyimides having a phenyltrimethylindane or phenylindane structure), or polyetherimide.

Specific examples of suitable sulfone-based thermoplastic compounds include, but are not limited to, polyethersulfones and the polyethersulfone-polyetherethersulfone copolymer oligomers as described in US 2004/044141 A1. Specific examples of suitable imide-based thermoplastic compounds include, but are not limited to, polyimides and the polyimide-phenyltrimethylindane oligomers as described in U.S. Pat. No. 3,856,752.

As used herein, the term oligomer refers to a polymer with a relatively low molecular weight in which a finite number of approximately ten to approximately 100 monomer molecules are bonded to each other. In an embodiment, the component [D] is an oligomer.

The molecular weight of the component [D] is preferably a weight-average molecular weight of 150,000 g/mol or less. More preferably, the weight-average molecular weight is 7,000 to 150,000 g/mol. If less than 7,000 g/mol, the effect of improvement in physical properties will be slight, and the heat resistance of the benzoxazine resin composition will suffer. If greater than 150,000 g/mol, compatibility with the curable benzoxazine resin composition will be poor, and no improvement in physical properties will be obtained in the curable or cured benzoxazine resin composition or the carbon fiber-reinforced composite material. In addition, when dissolved, the viscosity will be too high even when blended in small amounts, and the tackiness and draping properties will decline when producing prepregs. When the component [D] having a weight-average molecular weight of 7,000 to 150,000 g/mol is used, this has the effect of improving compatibility with the benzoxazine resin composition and of improving physical properties without compromising the heat resistance of the benzoxazine resin composition. Moreover, suitable tackiness and draping properties are provided when producing prepregs.

The average molecular weight referred to in the embodiments herein indicates the weight-average molecular weight obtained by gel permeation chromatography ("GPC" below). Examples of the method for measuring number-average molecular weight include a method wherein two Shodex 80M® [columns] (manufactured by Showa Denko) and one Shodex 802® [column] (manufactured by Showa Denko) are used, 0.3 µL of sample is injected, and the retention time of the sample measured at a flow rate of 1 mL/min is converted to molecular weight by utilizing the retention time of a calibration sample composed of polystyrene. When multiple peaks are observed in liquid chromatography, the target components are separated beforehand by liquid chromatography, and each component is then subjected to GPC, followed by molecular weight conversion.

Although the benzoxazine resin composition need not contain a thermoplastic compound as the component [D], in various embodiments of the invention the benzoxazine resin composition is comprised of at least 1, at least 5, or at least 10 parts by weight of the component [D] i.e. the thermoplastic compound per 100 parts by weight in total of components [A], [B], and [C]. For example, the curable benzoxazine resin composition may be comprised of from 5 to 30 parts by weight of the component [D] (thermoplastic compound) per 100 parts by weight in total of components [A], [B], and [C].

In certain embodiments of the present invention, the ratios of components [A], [B], and [C] are varied such that mass ratio of [A]/[B] is between 1/2 and 5/1 inclusive and the mass ratio of [C]/([A]+[6]) is between 1/9 and 2/3 inclusive. Surprisingly, it has been found that these ratios provide a Tg and flexural modulus higher than expected, based on the rule of mixtures, generating a resin that is particularly well suited to structural aerospace applications. Moreover, these ratios provide a resin viscosity that is ideally suited for prepregs and fiber-reinforced composite materials manufacturing.

In certain embodiments, the curable benzoxazine resin composition additionally comprises of, additionally consists essentially of, or additionally consists of one or more further additives. Examples of such suitable additional additives include, but are not limited to, tougheners, catalysts, reinforcing agents, fillers, adhesion promoters, flame retardants, thixotropic agents, and combinations thereof.

In certain embodiments of the present invention, the curable benzoxazine resin composition preferably has a viscosity at 40° C. of from $1.0 \times 10^2$ to $1.0 \times 10^6$ poise. It is possible to obtain a prepreg having an appropriate cohesiveness by setting the viscosity at 40° C. to $1.0 \times 10^2$ poise or more, and it is possible to impart appropriate drape property and tackiness when laminating the prepreg by setting the viscosity at 40° C. to $1.0 \times 10^6$ poise or less. The viscosity at 40° C. is more preferably in the range of $1.0 \times 10^3$ to $1.0 \times 10^5$ poise and particularly preferably in the range of $1.0 \times 10^4$ to $1.0 \times 10^5$ poise.

In further certain embodiments, the minimum viscosity of the benzoxazine resin composition is preferably 0.1 to 300 poise, more preferably 0.5 to 100 poise, and particularly preferably 1 to 50 poise. If the minimum viscosity is too low, the flow of the matrix resin might be too high so resin might be discharged out of the prepreg during prepreg curing. Furthermore, there is a possibility that the desired resin fraction might not be achieved for the fiber reinforced composite material obtained, the flow of the matrix resin in the prepreg might be insufficient, the consolidation process of the prepreg might terminate prematurely, and that many voids might occur in the fiber reinforced composite material obtained. If the minimum viscosity is too high, there is a possibility that the flow of the matrix resin in the prepreg might be low, the consolidation process of the prepreg might terminate prematurely, and many voids might occur in the fiber reinforced composite material obtained. Herein, the viscosity 40° C. and the minimum viscosity are determined by the following methods. Namely, measurements are performed using a 40 mm diameter parallel plate rheometer (ARES, manufactured by TA Instruments) with a gap of 0.6 mm. Torsional displacement was applied at 10 rad/s. The temperature was increased at 2° C./min from 40° C. to 180° C.

In other embodiments, when the benzoxazine resin composition is cured, the glass transition temperature of matrix is preferably at least 200° C., more preferably at least 215° C. and particularly preferably at least 230° C., as determined by the G' onset method (described in more detail in the Examples).

According to still further embodiments, when the benzoxazine resin composition is cured to provide a cured matrix having a flexural modulus of elasticity, the flexural modulus of elasticity of the cured matrix at 25° C. may be preferably at least 4.3 GPa, more preferably at least 4.5 GPa and particularly preferably at least 4.7 GPa.

Next, fiber-reinforced composite (FRC) materials are described. By curing embodiments of the benzoxazine resin composition after impregnating reinforcing fibers with it, a FRC material that contains, as its matrix resin, embodiments of the curable benzoxazine resin composition in the form of a cured product may be obtained.

There are no specific limitations or restrictions on the type of reinforcing fiber used in the present invention, and a wide range of fibers, including but not limited to, glass fiber, carbon fiber, graphite fiber, aramid fiber, boron fiber, alumina fiber and silicon carbide fiber, may be used. Carbon fiber may provide FRC materials that are particularly lightweight and stiff. Carbon fibers with a tensile modulus of 180 to 800 GPa may be used, for example. If a carbon fiber with a high modulus of 180 to 800 GPa is combined with a curable benzoxazine resin composition of the present invention, a desirable balance of stiffness, strength and impact resistance may be achieved in the fiber-reinforced composite material.

There are no specific limitations or restrictions on the form of reinforcing fiber, and fibers with diverse forms may be used, including, for instance, long fibers (drawn in one direction), tow, fabrics, mats, knits, braids, and short fibers (chopped into lengths of less than 10 mm). Here, long fibers mean single fibers or fiber bundles that are effectively continuous for at least 10 mm. Short fibers, on the other hand, are fiber bundles that have been chopped into lengths of less than 10 mm. Fiber configurations in which reinforcing fiber bundles have been aligned in the same direction may be suitable for applications where a high specific strength and specific modulus are required.

The fiber-reinforced composite materials according to embodiments of the present invention may be manufactured using methods such as the prepreg lamination and molding method, resin transfer molding method, resin film infusion method, hand lay-up method, sheet molding compound method, filament winding method and pultrusion method, though no specific limitations or restrictions apply in this respect.

Resin transfer molding is a method in which a reinforcing fiber base material is directly impregnated with a liquid thermosetting resin composition (such as the benzoxazine resin composition described herein) and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

Prepreg lamination and molding is a method in which a prepreg or prepregs, produced by impregnating a reinforcing fiber base material with a thermosetting resin composition, is/are formed and/or laminated, followed by the curing of the resin through the application of heat and pressure to the formed and/or laminated prepreg/prepregs to obtain a FRC material.

Filament winding is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core may or may not be removed.

Pultrusion is a method in which reinforcing fibers are continuously passed through an impregnating tank filled with a liquid thermosetting resin composition to impregnate them with the thermosetting resin composition, followed by a squeeze die and heating die for molding and curing, by continuously drawing them using a tensile machine. Since this method offers the advantage of continuously molding FRC materials, it is used for the manufacture of FRC materials for fishing rods, rods, pipes, sheets, antennas, architectural structures, and so on.

Of these methods, the prepreg lamination and molding method may be used to give excellent stiffness and strength to the fiber-reinforced composite materials obtained.

Prepregs may contain embodiments of the curable benzoxazine resin composition of the present invention and reinforcing fibers. Such prepregs may be obtained by impregnating a reinforcing fiber base material with a curable benzoxazine resin composition according to embodiments of the present invention. Impregnation methods include the wet method and hot melt method (dry method).

The wet method is a method in which reinforcing fibers are first immersed in a solution of the curable benzoxazine resin composition of the present invention, created by dissolving the curable benzoxazine resin composition in a solvent, such as methyl ethyl ketone or methanol, and retrieved, followed by the removal of the solvent through evaporation via an oven, etc. to impregnate reinforcing fibers with the benzoxazine resin composition.

The hot-melt method may be implemented by impregnating reinforcing fibers directly with a benzoxazine resin composition, made fluid by heating in advance, or by first coating a piece or pieces of release paper or the like with a benzoxazine resin composition for use as resin film and then placing a film over one or either side of reinforcing fibers as configured into a flat shape, followed by the application of heat and pressure to impregnate the reinforcing fibers with the resin. The hot-melt method may give the prepreg having virtually no residual solvent in it.

The reinforcing fiber cross-sectional density of a prepreg may be 50 to 350 g/m$^2$. If the cross-sectional density is at least 50 g/m$^2$, there may be a need to laminate a small number of prepregs to secure the predetermined thickness when molding a fiber-reinforced composite material and this may simplify lamination work. If, on the other hand, the cross-sectional density is no more than 350 g/m$^2$, the drapability of the prepreg may be good. The reinforcing fiber mass fraction of a prepreg may be 50 to 90 mass % in some embodiments, 60 to 85 mass % in other embodiments or even 70 to 80 mass % in still other embodiments. If the reinforcing fiber mass fraction is at least 50 mass %, there is sufficient fiber content, and this may provide the advantage of a fiber-reinforced composite material in terms of its excellent specific strength and specific modulus, as well as preventing the FRC material from generating too much heat during the curing time. If the reinforcing fiber mass fraction is no more than 90 mass %, impregnation with the resin may be satisfactory, decreasing a risk of a large number of voids forming in the fiber-reinforced composite material.

To apply heat and pressure under the prepreg lamination and molding method, the press molding method, autoclave molding method, bagging molding method, wrapping tape method, internal pressure molding method, or the like may be used as appropriate.

Autoclave molding is a method in which prepregs are laminated on a tool plate of a predetermined shape and then covered with bagging film, followed by curing, performed through the application of heat and pressure while air is drawn out of the laminate. It may allow precision control of the fiber orientation, as well as providing high-quality molded materials with excellent mechanical characteristics, due to a minimum void content. The pressure applied during the molding process may be 0.3 to 1.0 MPa, while the molding temperature may be in the 90 to 300° C. range. Due to the exceptionally high Tg of the cured benzoxazine resin composition of the present invention, it may be advantageous to carry out curing of the prepreg at a relatively high temperature (e.g., a temperature of at least 180° C. or at least 200° C.). For example, the molding temperature may be from 200° C. to 275° C. Alternatively, the prepreg may be molded at a somewhat lower temperature (e.g., 90° C. to 200° C.), demolded, and then post-cured after being removed from the mold at a higher temperature (e.g., 200° C. to 275° C.).

The wrapping tape method is a method in which prepregs are wrapped around a mandrel or some other cored bar to form a tubular fiber-reinforced composite material. This method may be used to produce golf shafts, fishing poles and other rod-shaped products. In more concrete terms, the method involves the wrapping of prepregs around a mandrel, wrapping of wrapping tape made of thermoplastic film over the prepregs under tension for the purpose of securing the prepregs and applying pressure to them. After curing of the resin through heating inside an oven, the cored bar is removed to obtain the tubular body. The tension used to wrap the wrapping tape may be 20 to 100 N. The molding temperature may be in the 80 to 300° C. range.

The internal pressure forming method is a method in which a preform obtained by wrapping prepregs around a thermoplastic resin tube or some other internal pressure applicator is set inside a metal mold, followed by the introduction of high pressure gas into the internal pressure applicator to apply pressure, accompanied by the simultaneous heating of the metal mold to mold the prepregs. This method may be used when forming objects with complex shapes, such as golf shafts, bats, and tennis or badminton rackets. The pressure applied during the molding process may be 0.1 to 2.0 MPa. The molding temperature may be between room temperature and 300° C. or in the 180 to 275° C. range.

The fiber-reinforced composite material produced from the prepreg of the present invention may have a class A surface as mentioned above. The term "class A surface" means a surface that exhibits extremely high finish quality characteristics free of aesthetic blemishes and defects.

The fiber-reinforced composite materials that contain cured benzoxazine resin compositions obtained from curing the curable benzoxazine resin compositions according to embodiments of the present invention and reinforcing fibers are advantageously used in sports applications, general industrial applications, and aeronautic and space applications. Sports applications in which these materials are advantageously used include golf shafts, fishing rods, tennis or badminton rackets, hockey sticks and ski poles. General industrial applications in which these materials are advantageously used include structural materials for vehicles, such as automobiles, bicycles, marine vessels and rail vehicles, drive shafts, leaf springs, windmill blades, pressure vessels, flywheels, papermaking rollers, roofing materials, cables, and repair/reinforcement materials.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

In the examples of the present invention, the measurements of the properties were based on the methods described below. The details for each of the examples are shown in Tables 1-3.

<Resin Plaque Preparation>

A mixture was created by dissolving the prescribed amounts of all the components in a mixture. The benzoxazine resin composition was dispensed into a mold cavity set for a thickness of 2 mm using a 2 mm-thick polytetrafluoroethylene (PTFE) spacer. Then, the benzoxazine resin composition was cured by heat treatment in an oven to obtain a 2 mm-thick cured resin plaque.

<Production of Fiber-Reinforced Composite (FRC) Material>

A prepreg comprising the specified reinforcing fiber impregnated with the specified resin composition was prepared. First, a mixture was created by dissolving the prescribed amounts of all the components in a mixture. Next, it was coated onto release paper using a knife coater to produce two sheets of resin film. The aforementioned two sheets of fabricated resin film were overlaid on both sides of the specified fiber configuration in the form of a sheet and the benzoxazine resin composition was impregnated using rollers to produce a prepreg with a carbon fiber areal weight of 190 grams/m$^2$ and resin content of 35%.

<Fiber Areal Weight>

Resin Areal Weight (RAW) was determined by taking the filmed resin, prior to prepregging, and cutting out 100×100 mm square samples, scraping off the resin on the squares, and measuring the weight of the resin. The areal weight is twice this weight divided by the area of the square sample. Fiber Areal Weight (FAW) was measured via a similar method post prepregging, by cutting out 100×100 mm square samples, weighing the prepreg and subtracting the RAW from this value.

<Resin Content>

The Resin Content (RC) is the percent by weight of the resin in the prepreg.

$$RC = \frac{RAW}{(RAW + FAW)}$$

<Curing>

Neat resin plaques were cured with one of two cure profiles in a convection oven.

Cure Condition 1
- (1) temperature raised at a rate of 1.5° C./min from room temperature to 180° C.;
- (2) held for two hours at 180° C.;
- (3) temperature raised at a rate of 1.5° C./min from 180° C. to 220° C.;
- (4) held for two hours at 220° C.;
- (5) temperature lowered from 220° C. to 30° C. at a rate of 3° C./min.

Cure Condition 2
- (1) temperature raised at a rate of 1.5° C./min from room temperature to 180° C.;
- (2) held for two hours at 180° C.;
- (3) temperature raised at a rate of 1.5° C./min from 180° C. to 220° C.;
- (4) held for six hours at 220° C.;
- (5) temperature raised at a rate of 1.5° C./min from 220° C. to 240° C.;
- (6) held for six hours at 240° C.;
- (5) temperature lowered from 240° C. to 30° C. at a rate of 3° C./min.

Composite materials were cured in an autoclave with vacuum applied until the pressure exceeded 20 PSI. 85 PSI was applied during the initial temperature ramp and was maintained for the entire cure cycle. The thermal profile was identical to Cure Condition 1.

<Viscosity>

Uncured resin specimens were placed in a 40 mm diameter parallel plate rheometer (ARES, manufactured by TA Instruments) with a gap of 0.6 mm preheated to 40° C. Torsional displacement was applied at 10 rad/s. The temperature was increased at 2° C./min until the viscosity decreased below the detection limit, 1.1 poise, or the minimum viscosity of the resin was determined.

<Glass Transition Temperature of Cured Benzoxazine Resin Compositions>

Specimens were machined from the cured 2 mm resin plaque, and then measured at 1.0 Hz in torsion mode using a dynamic viscoelasticity measuring device (ARES, manufactured by TA Instruments) by heating it from 50° C. to 300° C. at a rate of 5° C./min in accordance with SACMA SRM 18R-94. The glass transition temperature (Tg) was determined by finding the intersection between the tangent line of the glassy region and the tangent line of the transition region between the glassy region and the rubbery region on the temperature-log elastic storage modulus curve. The temperature at that intersection was considered to be the glass transition temperature, commonly referred to as G' onset Tg.

<Flexural Testing of Cured Benzoxazine Resin Compositions>

Specimens were machined from the cured 2 mm resin plaque and the flexural modulus of elasticity and strength was measured in accordance with ASTM D-790 at room temperature.

<Open Hole Compression Strength (OHC) for FRC>

In some embodiments, an FRC laminate comprising the epoxy resin composition was prepared to test open hole compression (OHC) strength. The prepreg was cut into 350 mm×350 mm samples. After layering 16 sheets of the fabric prepreg samples to produce a $[+45, 0, -45, 90]_{2s}$ configuration laminate, vacuum bagging was carried out, and the laminate was cured according to the procedure disclosed above to obtain a quasi-isotropic FRC material. This test specimen was then subjected to open hole compression testing as prescribed in ASTM-D6484 using an Instron universal testing machine.

<Raw Materials>

The following commercial products and chemicals were employed in the preparation of the benzoxazine resin compositions.

Component [A]:

Araldite® MT35900 (produced by Huntsman Advanced Materials), thiodiphenol type benzoxazine resin, Formula (V).

BS-BXZ, (produced by Konishi Chemical Inc Co., LTD) bisphenol S-aniline type benzoxazine resin, Formula (IV).

Component [B]:

Araldite® MT35600 (produced by Huntsman Advanced Materials), bisphenol A-aniline type benzoxazine resin, Formula (X).

F-a (produced by Shikoku Chemicals Corp.), bisphenol F-aniline type benzoxazine resin, Formula (XI).

P-d (produced by Shikoku Chemicals Corp.), phenol-diaminodiphenylmethane type benzoxazine resin, Formula (XV).

Component [C]:

Araldite® CY-179 (produced by Huntsman Advanced Materials), 3,4-epoxycyclohexylmethyl 3,4-epoxycyclohexanecarboxylate, Formula (XX) where X is $CH_2OC(=O)$.

Celloxide® 8000 (produced by Diacel Corporation), Bis (3,4-epoxycyclohexyl), Formula (XX) where X is a direct bond.

Epochalic™ THI-DE (produced by JXTG Nippon Oil and Energy Corporation), tetrahydroindene diepoxide, Formula (XX).

Epochalic™ DE-102 (produced by JXTG Nippon Oil and Energy Corporation), tetracyclotetradecadiene diepoxy, Formula (XVI).

Epochalic™ DE-103 (produced by JXTG Nippon Oil and Energy Corporation), pentacyclopentadecadiene diepoxy, Formula (XVII).

Other Component:

Epon™ 828 (produced by Hexion Inc.), Bisphenol A diglycidyl ether.

Component [D]:

Matrimid® 9725 (produced by Huntsman Advanced Materials), polyimide, weight-average molecular weight 80,000 g/mol;

Virantage® VW30500 (produced by Solvay), polyethersulfone, weight-average molecular weight 14,000 g/mol.

The benzoxazine resin compositions as shown in Table 1 and Table 2 were produced as follows. A mixture was created by dissolving the prescribed amounts of all the components. The benzoxazine resin composition was dispensed into a mold cavity set for a thickness of 2 mm using a 2 mm-thick polytetrafluoroethylene (PTFE) spacer. Then, the benzoxazine resin composition was cured according to cure condition 1 or cure condition 2 by heat treatment in an oven to obtain a 2 mm-thick cured resin plaque. The measured properties of the neat resin compositions (in cured form) are stated in Table 1 and Table 2.

Examples 1 to 4 provided unexpectedly good results compared with Comparative Examples 1 to 6 in terms of simultaneously providing a range of desirable glass transition temperature and flexural modulus. Comparison between Example 1 and Comparative Example 2 highlights this advantage, demonstrating that substituting 25 PHR of F-a with MT35900 resulted in significant improvement in the Tg, while maintaining a desirable modulus. Comparison between Example 4 and Comparative Example 5 highlights this advantage, demonstrating that substituting 5 PHR of MT35900 with F-a resulted in significant improvement in the modulus, while maintaining a desirable Tg. This is surprising given that F-a has a much lower Tg than MT35900 either cured as a single component or blended with CY-179.

Comparison between Example 2, Example 8, Comparative Example 3, and Comparative Example 6 highlights the significant reduction in Tg if the ratio of CY-179 to benzoxazine is chosen outside of the preferred range.

Example 1, Example 2, Example 3, and Example 4 highlight the range at which the Tg increases above what is predicted with the rule of mixtures with increasing MT35900 concentration, while providing a good flexural modulus.

Example 2 and Example 3 highlight particularly favorable combinations of Tg and modulus with blending particular ratios of the component [A], the component [B], and the component [C].

Example 6 highlights the favorable modulus and viscosity with the addition of component [D] when compared to Example 3. Example 6 also highlights the advantage of the addition of component [D] to modulus, Tg, and viscosity relative to Example 15.

Example 7 highlights the favorable combination of Tg and modulus utilizing Celloxide 8000 as component [C].

Example 9, Example 10, and Example 11 highlights the favorable Tg and modulus when utilizing BS-BXZ benzoxazine, Formula (IV), as component [A].

Examples 12, Example 13, and Example 14 highlights the favorable Tg and modulus when utilizing component [C] where X is not present in Formula (II) and are part of fused ring system.

Comparative Example 7 highlights the low Tg when utilizing an epoxy other than component [C].

Example 16 highlights the simultaneous high Tg and modulus had when utilizing P-d type benzoxazine, Formula (IB'), as component [B] within the specified ratios.

Table 3 exemplifies the favorable Tg and open hole compression in fiber reinforced composite materials obtained by curing a prepreg prepared with benzoxazine resin with particular ratios of component [A], component [B], component [C], and component [D]. Example 17, Example 18, and Example 19 highlight the favorable Tg and open hole compression with different carbon fiber types and different sizings. Example 20 highlights the favorable Tg and open hole compression utilizing a ratio of component [A] to component [B] of 27/8 and a ratio of component [C] to the ratio of the sum of component [A] and component [B] ([C]/([A]+[B]) of 3/7, higher ratios than illustrated in Example 17, Example 18, and Example 19. Comparative Example 9 highlights the reduction in Tg in a fiber reinforced composite when the ratio of component [A] to component [B] is outside of the specified range.

TABLE 1

|  |  | Comparative Example 1 | Comparative Example 2 | Comparative Example 3 | Comparative Example 4 | Comparative Example 5 |
|---|---|---|---|---|---|---|
| Component [A] | Araldite ® MT35900 [PHR] | 75 |  | 33 | 36 | 65 |
| Component [B] | F-a [PHR] |  | 75 | 22 | 64 | 10 |
| Component [C] | CY-179 [PHR] | 25 | 25 | 45 |  | 25 |
| Mass Ratio [A]/[B] |  | N/A | 0 | 3/2 | 9/16 | 13/2 |
| Mass Ratio [C]/([A] + [B]) |  | 1/3 | 1/3 | 9/11 | 0 | 1/3 |
| Cure Condition |  | 1 | 1 | 1 | 1 | 1 |
| Cured Resin Properties | Tg [° C.] | 242 | 190 | 191 | 157 | 231 |
|  | Flexural modulus [GPa] | 4.2 | 4.9 | 4.5 | 5.5 | 4.2 |
| Uncured Resin Properties | Viscosity at 40° C. [P] |  |  |  |  |  |
|  | minimum Viscosity [P] |  |  |  |  |  |

|  |  | Comparative Example 6 | Example 1 | Example 2 | Example 3 | Example 4 |
|---|---|---|---|---|---|---|
| Component [A] | Araldite ® MT35900 [PHR] | 55 | 25 | 30 | 45 | 60 |
| Component [B] | F-a [PHR] | 37 | 50 | 45 | 30 | 15 |
| Component [C] | CY-179 [PHR] | 8 | 25 | 25 | 25 | 25 |
| Mass Ratio [A]/[B] |  | 3/2 | 1/2 | 2/3 | 3/2 | 4/1 |
| Mass Ratio [C]/([A] + [B]) |  | 2/23 | 1/3 | 1/3 | 1/3 | 1/3 |
| Cure Condition |  | 1 | 1 | 1 | 1 | 1 |
| Cured Resin Properties | Tg [° C.] | 189 | 221 | 228 | 235 | 239 |
|  | Flexural modulus [GPa] | 5.1 | 4.6 | 4.8 | 4.5 | 4.4 |
| Uncured Resin Properties | Viscosity at 40° C. [P] |  |  |  | 800 |  |
|  | minimum Viscosity [P] |  |  |  | <1.1 |  |

TABLE 2

| | | Comparative Example 7 | Comparative Example 8 | Example 5 | Example 6 | Example 7 | Example 8 | Example 9 |
|---|---|---|---|---|---|---|---|---|
| Component [A] | Araldite ® MT35900 [PHR] | 60 | 60 | 45 | 45 | 45 | 36 | |
| | BS-BXZ [PHR] | | | | | | | 30 |
| Component [B] | F-a [PHR] | 15 | 40 | 30 | 30 | | 24 | 45 |
| | Araldite ® MT35600 [PHR] | | | | | 30 | | |
| | P-d [PHR] | | | | | | | |
| Component [C] | Araldite ® CY-179 [PHR] | | | 25 | | 25 | 40 | 25 |
| | Celloxide ®8000 [PHR] | | | | 25 | | | |
| | Epochalic ™ THI-DE [PHR] | | | | | | | |
| | Epochalic ™ DE-102 [PHR] | | | | | | | |
| | Epochalic ™ DE-103 [PHR] | | | | | | | |
| Other Component | EP828 [PHR] | 25 | | | | | | |
| Component [D] | Matrimid ® 9725 [PHR] | | | 11 | 11 | | | |
| | VW30500 [PHR] | | | | | | | |
| Mass Ratio [A]/[B] | | 4/1 | 3/2 | 3/2 | 3/2 | 3/2 | 3/2 | 2/3 |
| Mass Ratio [C]/([A] + [B]) | | 0 | 0 | 1/3 | 1/3 | 1/3 | 2/3 | 1/3 |
| Cure Condition | | 1 | 1 | 1 | 1 | 1 | 1 | 1 |
| Cured Resin Properties | Tg [° C.] | 179 | 193 | 238 | 254 | 230 | 223 | 218 |
| | Flexural modulus [GPa] | 4.4 | 5.1 | 4.6 | 4.5 | 4.5 | 4.4 | 4.8 |
| Uncured Resin Properties | Viscosity at 40° C. [P] | | 3.9 × 10⁶ | 58,000 | | | | |
| | minimum Viscosity [P] | | 395.0 | 14 | | | | |

| | | Example 10 | Example 11 | Example 12 | Example 13 | Example 14 | Example 15 | Example 16 |
|---|---|---|---|---|---|---|---|---|
| Component [A] | Araldite ® MT35900 [PHR] | | | 45 | 45 | 45 | 45 | 42 |
| | BS-BXZ [PHR] | 45 | 60 | | | | | |
| Component [B] | F-a [PHR] | 30 | 15 | 30 | 30 | 30 | 30 | |
| | Araldite ® MT35600 [PHR] | | | | | | | |
| | P-d [PHR] | | | | | | | 28 |
| Component [C] | Araldite ® CY-179 [PHR] | 25 | 25 | | | | 25 | 30 |
| | Celloxide ®8000 [PHR] | | | | | | | |
| | Epochalic ™ THI-DE [PHR] | | | 25 | | | | |
| | Epochalic ™ DE-102 [PHR] | | | | 25 | | | |
| | Epochalic ™ DE-103 [PHR] | | | | | 25 | | |
| Other Component | EP828 [PHR] | | | | | | | |
| Component [D] | Matrimid ® 9725 [PHR] | | | | | | | |
| | VW30500 [PHR] | | | | | | 5 | |
| Mass Ratio [A]/[B] | | 3/2 | 4/1 | 3/2 | 3/2 | 3/2 | 3/2 | 3/2 |
| Mass Ratio [C]/([A] + [B]) | | 1/3 | 1/3 | 1/3 | 1/3 | 1/3 | 1/3 | 3/7 |
| Cure Condition | | 1 | 1 | 2 | 2 | 2 | 1 | 1 |
| Cured Resin Properties | Tg [° C.] | 218 | 221 | 232 | 250 | 238 | 234 | 240 |
| | Flexural modulus [GPa] | 4.8 | 4.6 | 4.9 | 5.2 | 5.9 | 4.3 | 4.3 |
| Uncured Resin Properties | Viscosity at 40° C. [P] | | | | | | 454 | |
| | minimum Viscosity [P] | | | | | | <1.1 | |

TABLE 3

| | | Example 17 | Example 18 | Example 19 | Example 20 | Comparative Example 9 |
|---|---|---|---|---|---|---|
| Component [A] | Araldite ® MT35900 [PHR] | 45 | 45 | 45 | 54 | 15 |
| Component [B] | F-a [PHR] | 30 | 30 | 30 | 16 | 60 |
| Component [C] | CY-179 [PHR] | 25 | 25 | 25 | 30 | 25 |
| Component [D] | Matrimid ® 9725 [PHR] | 5 | 5 | 7 | 11 | 9 |
| Carbon Fiber | Torayca | T700G-31E | T1100G-71E | T800S-10E | T1100G-71E | T1100G-71E |
| Mass Ratio [A]/[B] | | 3/2 | 3/2 | 3/2 | 27/8 | 1/4 |
| Mass Ratio [C]/([A] + [B]) | | 1/3 | 1/3 | 1/3 | 3/7 | 1/3 |
| Cure Condition | | 1 | 1 | 1 | 1 | 1 |
| FRC Properties | Tg [° C.] | 247 | 247 | 230 | 241 | 206 |
| | OHC [MPa] | 315 | 303 | 286 | 310 | 320 |

What is claimed is:

1. A curable benzoxazine resin composition comprised of at least a component [A], a component [B], component [C] and a component [D], wherein:

a) the component [A] is comprised of at least one benzoxazine of Formula (IA):

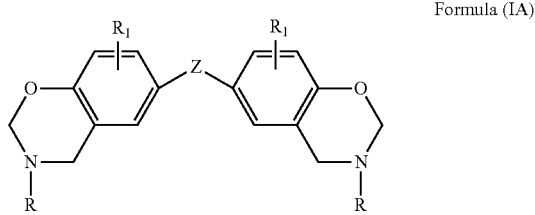

Formula (IA)

wherein Z is selected from C=O, $CH_2OC(=O)$, O, S, S=O, or O=S=O, each R is independently selected from hydrogen, a $C_1$-$C_{20}$ alkyl group, an allyl group, or a $C_6$-$C_{14}$ aryl group, and each $R_1$ is independently selected from hydrogen, a $C_1$-$C_{20}$ alkyl group, an allyl group, or a $C_6$-$C_{14}$ aryl group;

b) the component [B] is comprised of at least one benzoxazine of Formula (IA') and/or Formula (IB'):

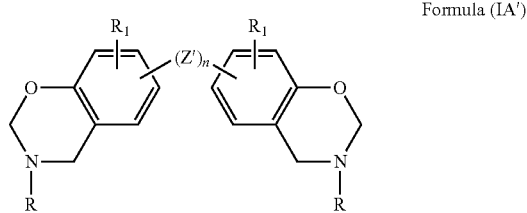

Formula (IA')

wherein n is 0 or 1; if n=1, Z' is selected from a substituted or unsubstituted $C_1$-$C_{20}$ alkyl group, a substituted or unsubstituted divalent $C_6$-$C_{20}$ aryl group, or a substituted or unsubstituted divalent $C_2$-$C_{20}$ heteroaryl group; and if n=0, the benzyl groups of the benzoxazine moieties are fused or connected by a direct bond between the two benzoxazine moieties;

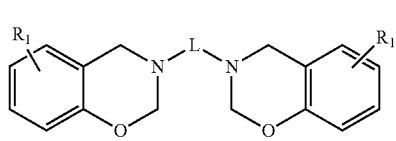

Formula (IB')

where L is selected from a divalent hydrocarbon linkage group such as $CH_2$, $C(CH_3)_2$, $CH(CH_3)$, dicyclopentadiene, Ar, and Ar—Y—Ar, where Y may be a direct bond $C(R_2)(R_3)$, $C(R_2)(Ar)$, a divalent heterocycle, $[C(R_2)(R_3)]_x$—Ar—$[C(R_4)(R_5)]_y$, S, $SO_2$, and O, where Ar is an aryl group. $R_2$, $R_3$, $R_4$, and $R_5$ are independently selected from H, $C_1$-$C_8$ alkyl and halogenated alkyl;

c) the component [C] is comprised of at least one cycloaliphatic epoxy resin represented by Formula (II):

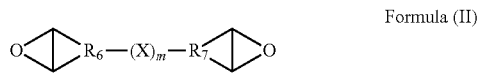

Formula (II)

wherein m=0 or 1; $R_6$ and $R_7$ are the same or different and are each a substituted or an unsubstituted $C_1$-$C_{20}$ aliphatic moiety which together with carbon atoms of an epoxy group form at least one aliphatic ring, wherein m is 0 or 1; when m=1, X represents a single bond, two single bonds or, a divalent moiety; wherein when m=0, the aliphatic rings are fused which include $R_6$ and $R_7$ (that is, a fused ring system is present which involves $R_6$ and $R_7$);

d) the component [D] comprises a thermoplastic compound comprising one or more repeating units, wherein the thermoplastic compound is a polyethersulfone or polyimide; and e) the component [A] and the component [B] are present in the curable benzoxazine resin composition in a mass ratio [A]/[B] of between 1/2 and 5/1 inclusive and component [A], component [B] and component [C] are present in a mass ratio [C]/([A]+[B]) of between 1/9 and 2/3 inclusive.

2. The curable benzoxazine resin composition according to claim 1, wherein the component [C] includes at least one cycloaliphatic epoxy resin represented by Formula (II), wherein $R_6$ and $R_7$ are each independently part of a cyclopentane ring, a cyclohexane ring, or a norbornane ring.

3. The curable benzoxazine resin composition according to claim 1, wherein the thermoplastic compound is a polyimide having a backbone which additionally contains phenyltrimethylindane or phenylindane units.

4. The curable benzoxazine resin composition according to claim 1, wherein the component [A] is comprised of two or more multifunctional benzoxazine moieties, which differ in at least one of Z, R or $R_1$.

5. The curable benzoxazine resin composition according to claim 1, wherein the component [B] is comprised of two or more multifunctional benzoxazine moieties, which differ in at least one of Z', L, R or $R_1$.

6. The curable benzoxazine resin composition according to claim 1, wherein when the cured benzoxazine resin composition has a glass transition temperature of at least 215° C. as determined by the G' onset method while also having a flexural modulus of at least 4.3 GPa.

7. The curable benzoxazine resin composition of claim 1, wherein the component [A] is comprised of at least one benzoxazine of Formula (IA) wherein Z is S.

8. The curable benzoxazine resin composition of claim 1, wherein the component [A] is comprised of at least one benzoxazine represented by Formula (IV), Formula (V), Formula (VI), Formula (VII) or Formula (VIII):

Formula (IV)

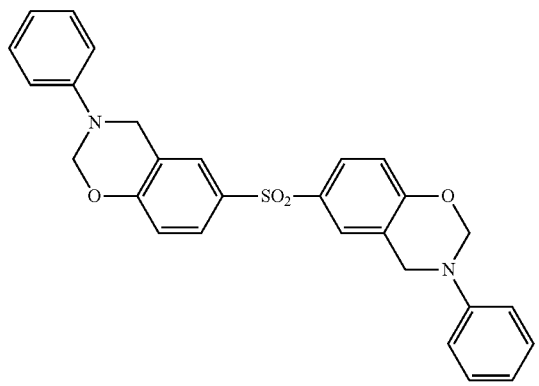

Formula (V)

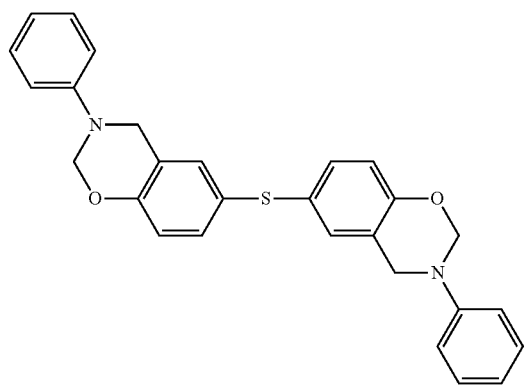

Formula (VI)

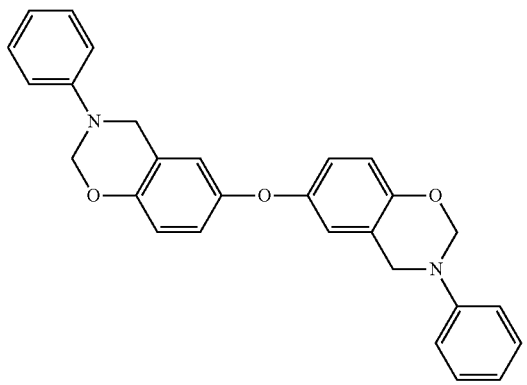

Formula (VII)

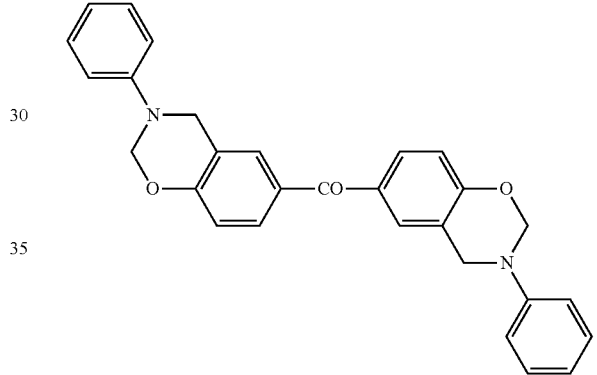

Formula (VIII)

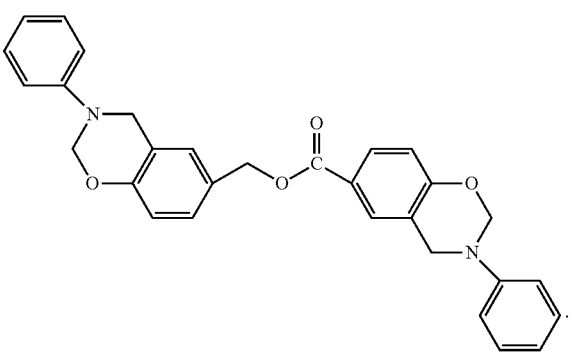

9. The curable benzoxazine resin composition of claim 1, wherein the component [B] is comprised of at least one benzoxazine represented by Formula (IX), Formula (X), Formula (XI), Formula (XII), Formula (XIII), or Formula (XIV):

Formula (IX)
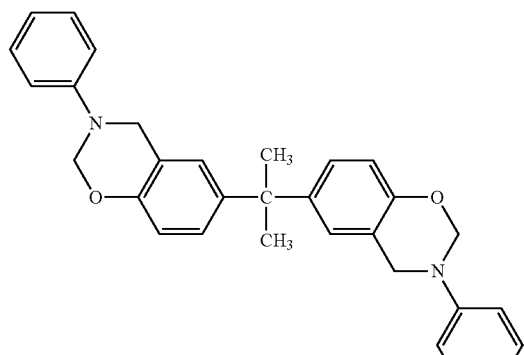
Formula (X)
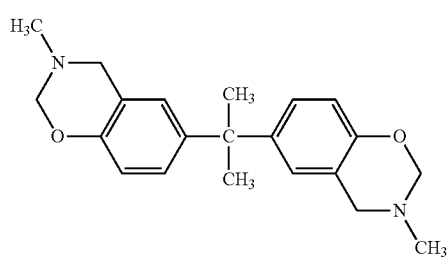
Formula (XI)
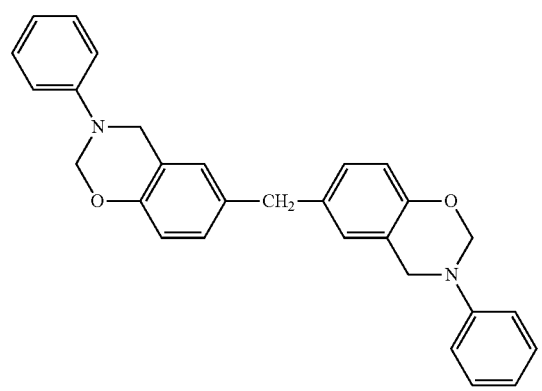
Formula (XII)
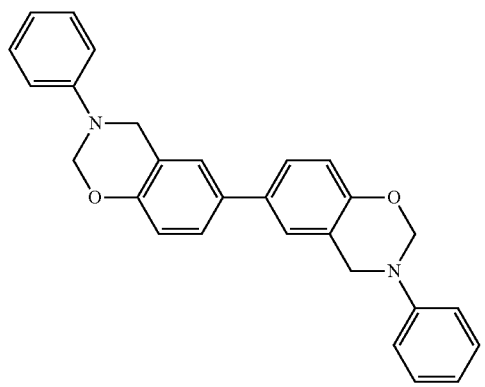
Formula (XIII)
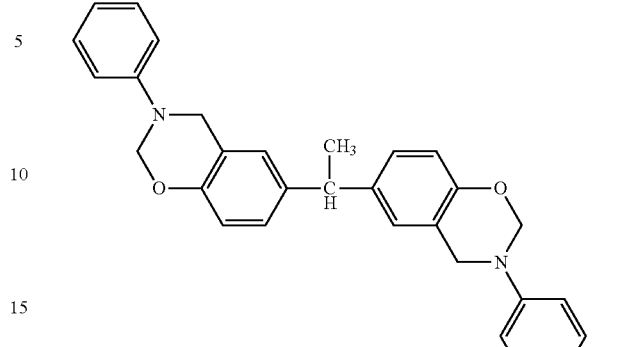
Formula (XIV)
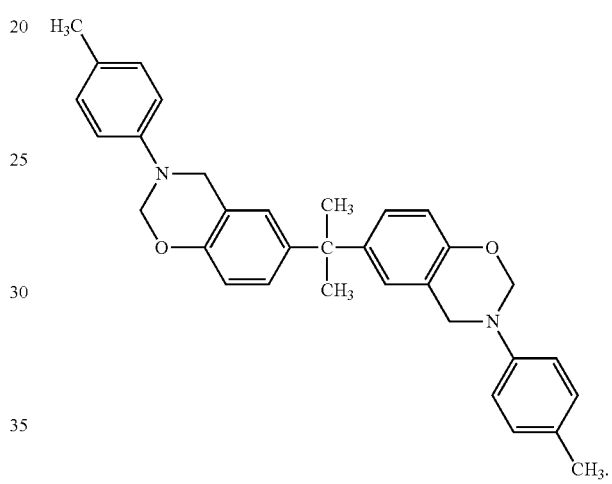
10. The curable benzoxazine resin composition of claim 1, wherein the component [A] is comprised of at least one benzoxazine represented by Formula (V):
Formula (V)
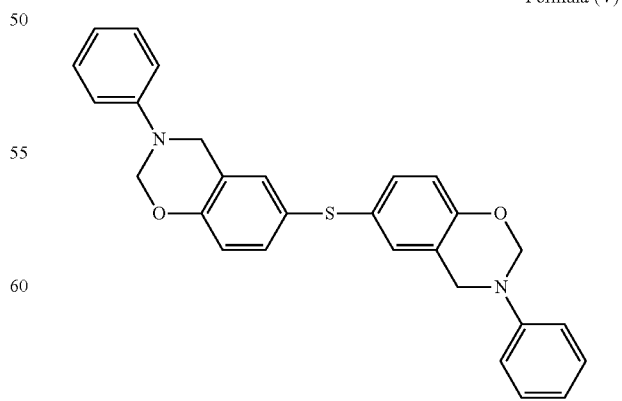

and the component [B] is comprised of at least one benzoxazine represented by Formula (IX) or Formula (XI):

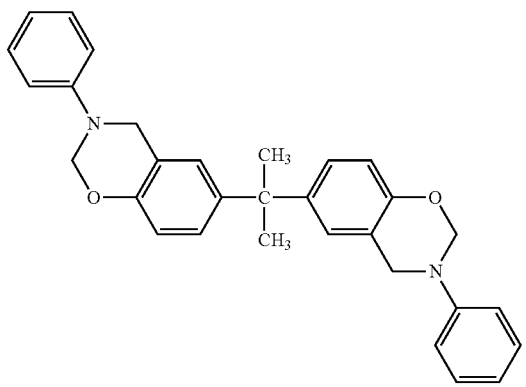

Formula (IX)

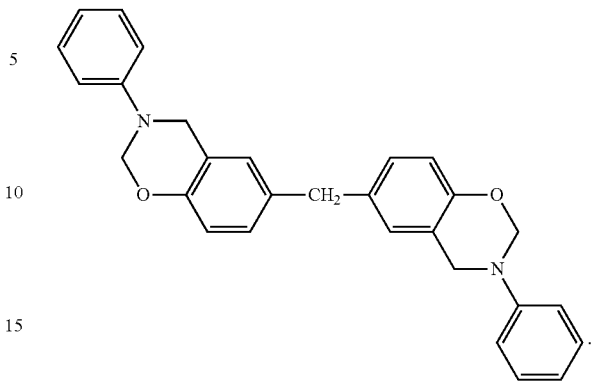

Formula (XI)

11. A prepreg, comprising a reinforcing fiber matrix impregnated with a curable benzoxazine resin composition in accordance with claim 1.

12. A fiber-reinforced composite material obtained by curing a prepreg in accordance with claim 11.

13. A fiber-reinforced composite material, comprising a cured matrix obtained by curing a mixture comprised of a curable benzoxazine resin composition in accordance with claim 1 and a reinforcing fiber.

14. The curable benzoxazine resin composition of claim 1, wherein the curable benzoxazine resin composition has a viscosity at 40° C. of from $1.0 \times 10^2$ to $1.0 \times 10^6$ poise.

15. The fiber-reinforced composite material of claim 12, obtained by an autoclave molding method, the method comprising laminating the prepregs on a tool plate of a predetermined shape, followed by curing the laminate.

* * * * *